United States Patent [19]
Muchmore et al.

[11] Patent Number: 5,062,517

[45] Date of Patent: Nov. 5, 1991

[54] TUNED DAMPER FOR A TORQUE CONVERTER CLUTCH

[75] Inventors: Robert A. Muchmore, Mason; William H. Roth, Centerville, both of Ohio

[73] Assignee: General Motors Corporation, Detroit, Mich.

[21] Appl. No.: 594,901

[22] Filed: Oct. 9, 1990

[51] Int. Cl.$^5$ ............................................. F16D 3/14
[52] U.S. Cl. ............................ 192/106.2; 192/106.1; 192/3.29; 74/574; 188/380
[58] Field of Search ............... 192/106.1, 106.2, 3.28, 192/3.29; 74/443, 574; 188/378, 379, 380

[56] References Cited

U.S. PATENT DOCUMENTS

| | | | |
|---|---|---|---|
| 2,346,972 | 4/1944 | Kishline | 74/574 |
| 3,314,304 | 4/1967 | Katzenberger et al. | 74/574 |
| 4,254,985 | 3/1981 | Kirschner | 74/443 X |
| 4,289,048 | 9/1981 | Mikel et al. | 192/3.29 X |
| 4,302,986 | 12/1981 | Shepherd | 74/574 |
| 4,437,551 | 3/1984 | Gimmler et al. | 192/3.28 |
| 4,569,668 | 2/1986 | Fukushima | 464/68 |
| 4,643,283 | 2/1987 | Wonn | 192/3.33 |
| 4,646,886 | 3/1987 | Nishimura | 192/3.28 |
| 4,775,042 | 10/1988 | Kohno et al. | 192/106.2 |
| 4,844,216 | 7/1989 | Fukushima | 192/3.29 X |
| 4,848,183 | 7/1989 | Ferguson | 74/574 |
| 4,867,290 | 9/1989 | Macdonald et al. | 192/3.28 |
| 4,895,047 | 1/1990 | George | 74/574 |
| 4,986,398 | 1/1991 | Olsen | 192/3.28 |

FOREIGN PATENT DOCUMENTS

| | | | |
|---|---|---|---|
| 2829253 | 1/1980 | Fed. Rep. of Germany | 74/574 |
| 3529274 | 2/1987 | Fed. Rep. of Germany | 74/574 |
| 3702176 | 8/1988 | Fed. Rep. of Germany | 74/574 |
| 58-152953 | 9/1983 | Japan | 74/574 |

*Primary Examiner*—Allan D. Herrmann
*Assistant Examiner*—Andrea Pitts
*Attorney, Agent, or Firm*—Donald F. Scherer

[57] ABSTRACT

A rotary damper is mounted to a clutch pressure plate within a torque converter clutch of an automatic transmission. The rotary damper is tuned to minimize the magnitude of a natural frequency of rotary vibration in a driveline system induced by the engine firing frequency.

4 Claims, 1 Drawing Sheet

TUNED DAMPER FOR A TORQUE CONVERTER CLUTCH

TECHNICAL FIELD

This invention relates to rotary dampers used to control rotary vibrations in a clutch disposed within a torque converter used with a transmission. The exemplary embodiment described in this disclosure establishes a tuned damper which is attached to the pressure plate of the clutch. The tuned damper is designed to damp out rotary vibrations at the natural frequency of the pressure plate relative to the other rotating components.

BACKGROUND OF THE INVENTION

Automatic transmission torque converters are often equipped with a clutch to rotatively link a torque converter turbine with a torque converter input shell, i.e. a clutch drive element. Engagement of a clutch pressure plate, i.e. a clutch driven element with the clutch drive element rotatively restricts the rotary displacement of the engine relative to a torque converter output element, eliminating the slip within an automatic transmission torque converter.

The clutch driven element is rotatively connected through intermediate elements to the turbine of the torque converter and to the output element of the torque converter, both of which are rotatively fixed to one another. One of the intermediate elements connecting the clutch driven element with the output element is a set of springs which compress to allow the clutch driven element to be rotatively displaced relative to the turbine and the torque converter output element. Spring compression occurs upon engagement of the clutch driven element with the clutch drive element when they are rotating at different speeds or when the clutch is engaged and subjected to transient torsional impulses, such as impulses produced by the engine firing frequency. When displacement between the elements occurs because of either clutch engagement or the transmission of transient impulses, the driveline system, comprising the elements rotatively connected to the clutch driven element, may respond by rotatively vibrating at a natural frequency associated with the system.

Driveline systems have a number of modes of vibration, each mode with its own natural frequency. It is desirable to minimize the amplitude of the vibrations produced by these vibration modes. A common method of minimizing and reducing the magnitude of the vibrations is to apply a rotary frictional load between the clutch driven element and the torque converter output element, in parallel with the spring force. Another method is to provide a viscous load between the clutch driven element and the torque converter output element. The result with either method is to damp out the vibrations between the clutch driven element and the torque converter output element.

Those damping methods may not be adequate when the frequency of the exciting force is at a natural frequency of the system. When the initial amplitude of the exciting force is sufficient to overcome the frictional or viscous resistance, and the exciting force is at a natural frequency, then the sympathetic elements of the driveline system will oscillate at an amplitude sufficiently large to become objectionable to the vehicle operator in the form of noise and vibrations transmitted through the structure of the vehicle.

The use of tuned propeller shaft dampers, the dampers comprising a ring shaped inertia element with a layer of rubber between the ring shaped inertia element and the propeller shaft, would not be effective in quieting these vibrations in the driveline system of a rear drive vehicle. Such a damper is beneficial only to the extent that reducing propeller shaft vibration reduces overall system vibration. In systems where the sympathetic element is being excited by the engine firing frequency and is on the input side of the transmission, a propeller shaft vibration damper would only be effective in damping the vibrations of those elements in a single gear ratio.

SUMMARY OF THE INVENTION

Analysis of the driveline system shows there are three modes of vibration, each with an associated natural frequency in a free/free system model of a three degree of freedom system. The first mode of vibration is the system rigid body mode in which all of the rotary inertias of the driveline system oscillate in phase with one another, resulting in a natural frequency of 0 hertz. The second mode of vibration occurs when the transmission rotary inertia and the engine rotary inertia (or the clutch driven element rotary inertia if the clutch is not engaged) oscillate out of phase with the equivalent vehicle rotary inertia. Here, the axle spring serves as the sole system node. The third mode of vibration occurs when the engine rotary inertia (or the clutch driven element rotary inertia if the clutch is not engaged) and the equivalent vehicle rotary inertia oscillate out of phase with the transmission rotary inertia, with the torque converter clutch spring and equivalent axle spring being the system nodes.

Mathematically, the natural frequencies can be expressed as follows: letting $W_1$ = the first natural frequency,
$W_2$ = the second natural frequency,
$W_3$ = the third natural frequency,
$J_1$ (when the clutch is not engaged) = the rotary inertia of the clutch driven element,
$J_2$ = the rotary inertia of the rotating transmission parts,
$J_3$ = the rotary inertia of the vehicle as reflected through a final drive ratio of the vehicle,
$K_1$ = the torsional spring rate between the transmission and the clutch driven element, and
$K_2$ = the torsional spring rate of the axles, then
$W_1$ = 0 radians/second, $W_2 = (((-J_1J_3 - J_1J_2)K_2 + (-J_2J_3 - J_1J_3)K_1) - ((J_1^2J_3^2 + 2J_1^2J_2$
$*J_3 + J_1^2J_2^2)K_2^2 + (2J_1^2 - 2J_1J_2)J_3^2 + (-2J_1J_2^2 - 2J_1^2J_2)J_3K_1K_2 +$
$(J_2^2 + 2*J_1J_2 + J_1^2)J_3^2K_1^2)^{0.5}/(2*J_1J_2J_3))^{0.5}$ rad/sec., and $W_3 = (((-J_1J_3 - J_1J_2)K_2 + (-J_2J_3 - J_1J_3)K_1 + ((J_1^2J_3^2 + 2J_1^2J_2*$
$J_3 + J_1^2J_2^2)K_2^2 + (2J_1^2 - 2J_1J_2)J_3^2 + (-2J_1J_2^2 - 2J_1^2J_2)J_3K_1K_2 +$
$(J_2^2 + 2*J_1J_2 + J_1^2)J_3^2K_1^2)^{0.5}/(2*J_1J_2J_3))^{0.5}$ rad/sec.

Engine cylinder firing frequencies which excite the driveline system at any of these natural frequencies will result in large amplitudes of vibration for the system rotary inertias as well as high levels of load in the springs which are nodes for the corresponding system mode.

The specific discovery here was that an engine firing frequency equal to the third natural frequency produced the noise and vibrations of which elimination was desired. Changing the clutch driven plate springs so as to provide a torsional spring rate for a natural frequency outside of the operating range of the engine firing frequency is a potential solution in some cases. For those cases where this is not possible though, the addition to the clutch driven element of a damper tuned to the third natural frequency would provide an effective solution. When excited at the natural frequency to which the damper has been designed, the tuned damper will oscillate at that natural frequency, but out of phase with the element to which it is coupled, reducing the amplitude of vibration.

It has also been discovered that the optimal clutch position for generating oscillations of the greatest magnitude is at the point of incipient contact, i.e. incipient engagement, between the clutch driven element and the clutch drive element. Given the rotary inertias and the spring rates of the elements common in many systems, the third natural frequency is often within the operating range of the engine firing frequency of the engine, inducing the clutch driven element to generate a vibration in the driveline system that can be sensed by the operator of the vehicle as audible transmissions if the natural frequency is above approximately 20 hertz, and as vibrations transmitted through the structure of the vehicle, such as the seat of the vehicle, the throttle, and the steering wheel.

Knowing both that the clutch is positioned at the point of incipient clutch contact and that the engine firing frequency equals the third natural frequency simultaneous to the vibrations reaching their greatest magnitude, it is possible to eliminate the vibrations by providing a damper tuned to the third natural frequency. The rotary inertia of the ring shaped inertia element and the torsional spring and the torsional damping characteristics of the visco-elastic material are to be chosen so that the tuned damper will have a natural frequency equal to the third natural frequency. With a tuned damper, vibration amplitude of the rotary inertias of the driveline system, as well as the torque levels in the torque converter clutch and axle springs, will be reduced during excitation of the driveline system at the third natural frequency. Because the third natural frequency is vehicle dependent, the rotary inertia of the ring shaped inertia element and the damping and spring characteristics of the visco-elastic material element must be selected for each vehicle application.

The following benefits will be derived from this invention:

1. rotary vibrational amplitudes will be reduced, reducing both the magnitude of audible driveline system noise and vibration perceived by the vehicle operator;

2. peak clutch spring torque at third mode natural frequency will be reduced, enhancing the durability characteristics of the clutch; and 3. a single spring package providing the same rate and travel could be used for multiple vehicle applications with the inertia of the ring shaped inertia element being selected to accommodate the different natural frequencies.

It is an object of this invention to provide an improved damper within an automatic transmission torque converter, comprising a ring shaped inertia element joined to a clutch driven element through a visco-elastic material element.

It is also an object of this invention to provide an improved damper within an automatic transmission torque converter, comprising a ring shaped inertia element joined to a clutch driven element through a visco-elastic material element which together damp out a vibration at a natural frequency dependent on the clutch driven element inertia, clutch spring rate, transmission inertia, suspension spring rate, and vehicle inertia system.

It is a further object of this invention to provide an improved damper within an automatic transmission torque converter, comprising a ring shaped inertia element joined to a clutch driven element through a visco-elastic material element which together damp out a vibration at a natural frequency, that natural frequency of rotary vibration $W_3$ dependent on the rotary inertia $J_1$ of the clutch driven element, on a torsional spring rate $K_1$ between the transmission and the clutch driven element, primarily controlled by the spring rate of the clutch springs, on a rotary inertia $J_2$ of the rotating transmission components, on a rotary inertia $J_3$ of the vehicle as reflected through a final drive ratio of the vehicle, and on a torsional spring rate $K_2$ of the vehicle primarily controlled by the rate, that dependence defined by the equation $$W_3 = (((-J_1J_3 - J_1J_2)K_2 + (-J_2J_3 - J_1J_3)K_1 + ((J_1{}^2J_3{}^2 + 2J_1{}^2J_2 \cdot J_3 + J_1{}^2J_2{}^2)K_2{}^2 + (2J_1{}^2 - 2J_1J_2)J_3{}^2 + (-2J_1J_2{}^2 - 2J_1{}^2J_2)J_3K_1K_2 + (J_2{}^2 + 2J_1J_2 + J_1{}^2)J_3{}^2K_1{}^2)^{0.5})/(2J_1J_2J_3))^{0.5} \text{ rad/sec}.$$

These and other objects and advantages will be more apparent from the following description and drawings.

DESCRIPTION OF THE PREFERRED EMBODIMENT

Figure 1:
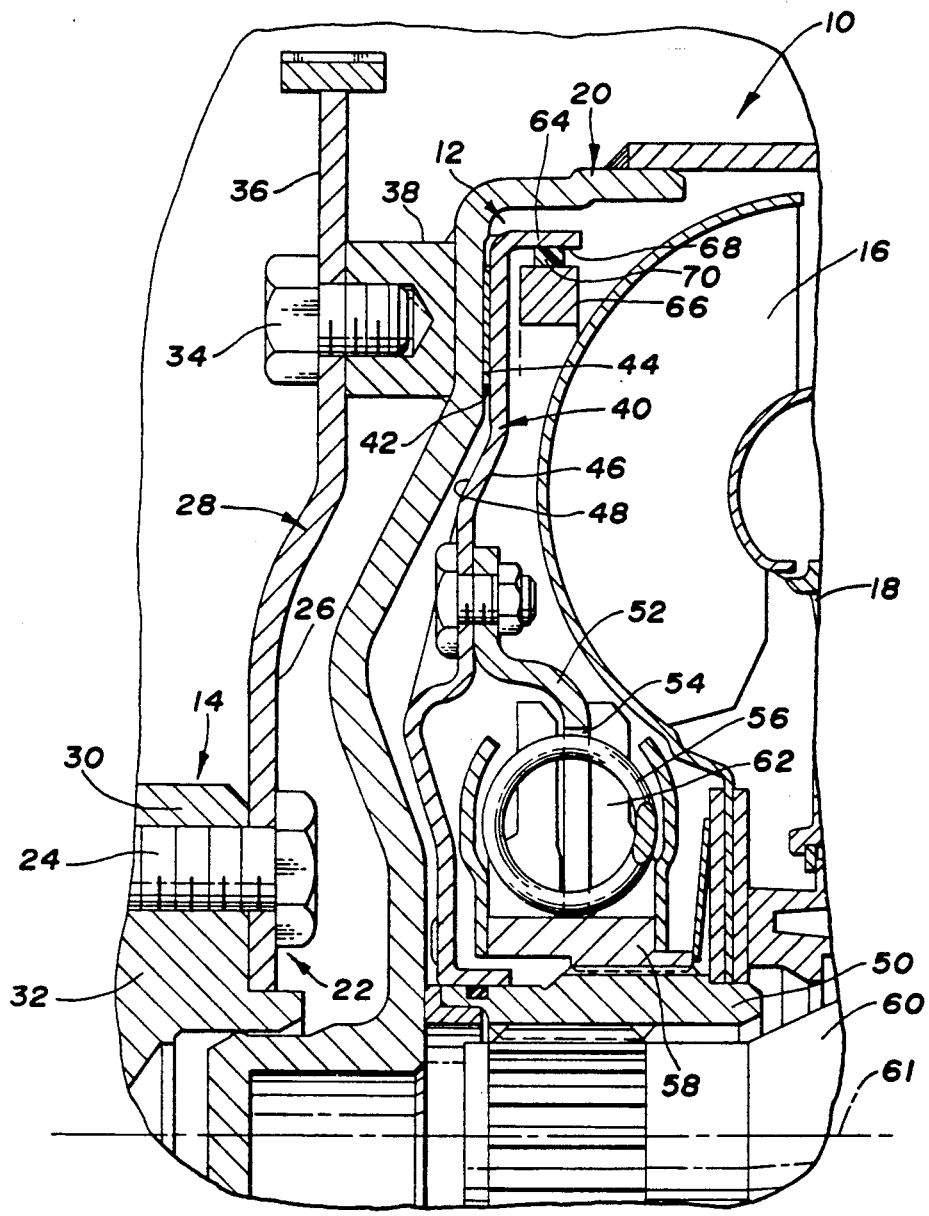
FIG. 1 is a sectional view of the relevant parts of the torque converter and the engine to torque converter attachment.

FIG. 1 shows a torque converter 10, for a transmission (not shown) in a vehicle (not shown), having an internally disposed clutch 12, and adapted to be driven by an internal combustion engine 14. The torque converter 10, is a conventional fluid drive mechanism and includes a turbine 16 and a stator 18 disposed in toroidal flow relation with an impeller (not shown), all disposed within an input shell 20. The impeller is secured for rotation with the input shell 20. The input shell 20 has a rigid rotary connection 22 to the engine 14 provided by bolts 24 passing from a torque converter side 26 of a flexplate 28 through to a flange 30 on the end of an engine crankshaft 32 and by bolts 34 passing through the same flexplate 28 from the engine side 36 and threading into threaded bosses 38 provided on the input shell 20.

Disposed between the turbine 16 and the input shell 20 in the direction of the engine 14 is the clutch 12. The clutch 12 includes a clutch pressure plate 40, i.e. a clutch driven element 40, with a friction pad 42, i.e. a clutch engagement surface 42, adapted to frictionally engage a complementary clutch engagement surface 44 of the input shell 20, i.e. the clutch drive element 20. The clutch driven element 40 has both an apply side 46 and a release side 48. The friction pad 42 is on the release side 48 of the clutch driven element 40 which faces the clutch engagement surface 44 of the input shell 20. The apply side 46 of the clutch driven element 40 faces the turbine 16.

The clutch driven element 40 is rotatively supported on a turbine hub 50. The clutch driven element 40 has an engagement portion 52 with a plurality of openings 54 to accommodate clutch springs 56. The openings 54 are of approximately the same shape and size as the springs 54 in their free state. The engagement portion 52 is concentric with and rotatively locked to the clutch driven element 40. A clutch hub 58 links the clutch driven element 40 to the turbine hub 50. The clutch hub 58 is splined to the turbine hub 50, allowing relative axial movement, but no rotary movement between the hubs 50 and 58. The turbine hub 50 in turn is splined to an output element 60 which drives a gear system (not shown) within the transmission. An axis of rotation 61 of the output element 60 is the axis of rotation 61 for all elements of the torque converter 10, including the clutch drive element 20 and the clutch driven element 40.

The clutch driven element 40 and clutch hub 58 interface so as to prevent axial movement of the clutch driven element 40 relative to the clutch hub 58. The clutch hub 58 has openings 62 for clutch springs 56 corresponding to the openings 54 in the engagement portion 52 of the clutch driven element 40. The clutch springs 56 are interposed between the clutch hub 58 and the engagement portion 52 to minimize the harshness of the torsional vibrations transmitted from the clutch driven element 40 to the clutch hub 58. The clutch springs 56 are disposed in the openings 54 and 62 so as to be axially compressed whenever there is rotary displacement of the clutch driven element 40 relative to the clutch hub 58.

The clutch driven element 40 has a lip 64 at its outer periphery which projects away from the clutch engagement surface 44. The lip 64 is concentric with the axis of rotation 61 of the clutch driven element 40.

A ring shaped inertia element 66 is centered relative to the clutch driven element 40. The ring shaped inertia element 66 is linked to an inside diameter 68 of the lip 64 by a visco-elastic material element 70. The visco-elastic material element 70 holds the ring shaped inertia element 66 concentric with the lip 64 of the clutch driven element 40. The visco-elastic material element 70 possesses both torsional spring and torsional damping characteristics. The ring shaped inertia element 66 is linked to the clutch driven element 40 in parallel with the clutch driven element's 40 link to the output shaft 60 through the clutch spring 56, the clutch hub 58, and the turbine hub.

The advantages of this invention become more apparent when observing the system in operation.

The clutch 12 typically remains disengaged during vehicle acceleration because the torque multiplying effect of the torque converter 10 is desired to aid in vehicle acceleration. Clutch 12 engagement usually occurs after the acceleration rate decreases. Engagement is initiated per a schedule (not shown) which is a function of throttle position and vehicle speed. When a combination of vehicle speed and throttle position corresponding to an engagement point in the schedule is reached, the clutch 12 is applied by supplying transmission fluid under pressure to the apply side 46 of the clutch driven element 40. This forces the clutch driven element 40 and the clutch hub 58 to translate axially toward the clutch drive element 20 until the friction pad 42 on the clutch driven element 40 comes into contact with the complementary clutch engagement surface 44 on the clutch drive element 20. There will, for most clutch engagements, be a speed differential between the two elements 20 and 40. The speed differential results in torque being developed upon engagement of the clutch drive element 20 with the clutch driven element 40. The magnitude of torque is dependent on both the relative speed of the engaging elements 20 and 40 and the rotary inertias of elements rotatively linked to the engaging elements 20 and 40. The torque is transmitted through the clutch driven element 40 into the clutch springs 56 and through the clutch springs 56 to the clutch hub 58, to the turbine hub 50 and into the torque converter output element 60. The clutch springs 56 between the clutch driven element 40 and the clutch hub 58 are compressed when transmitting torque. The deflection of the clutch springs 56 minimizes the harshness of the torque transmitted between the clutch driven disc 40 and the clutch hub 58, such as that produced by the engagement of the clutch drive element 20 and the clutch driven element 40, or the impact of the cylinder firings of the engine 14 on the output element 60. The deflections of the clutch springs 56 will produce undesired vibrations and oscillations at natural frequencies which are dependent on the spring rate of the clutch springs 56 as well as the rotary inertias and the spring rates of the other elements rotationally linked to the driven element 40. The elements rotatively linked to the driven element 40, including the output element 60, the transmission, and a vehicle suspension, comprise the driveline system. The natural frequencies will also vary with engagement and disengagement of the clutch 12 because that effectively changes the rotary inertia on the driven clutch element 40 side of the clutch springs 56.

This invention is designed to deal with a very specific mode of vibration, that mode occurring when there is incipient engagement between the clutch driven element 40 and the clutch drive element 20. The contact between the two elements 20 and 40 must be such that the effective rotary inertia of the clutch driven element 40 is not significantly altered by the rotary inertia of the clutch drive element 20 and of the engine 14, yet the engine firing frequency is transmitted to the clutch driven element 40. In many cases, the driveline system has a natural frequency near that of the engine firing frequency such that the clutch driven element is excited relative to the torque converter output element.

Figure 2:
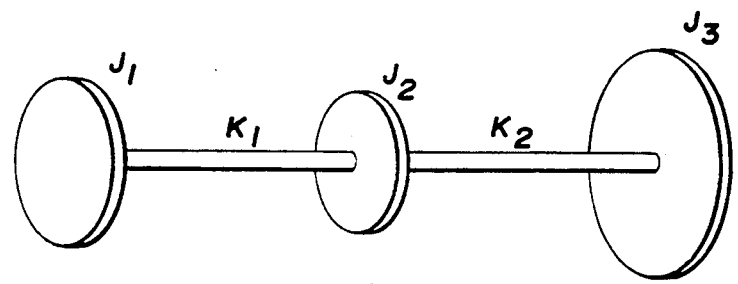
FIG. 2 is a schematic representation of the driveline system as a series of rotary inertias and torsional springs.

FIG. 2 shows a schematic diagram of the torsional elements of the driveline system from the rotary inertia $J_1$ of the clutch driven element 40 through the equivalent vehicle rotary inertia $J_3$.

The natural frequency of rotary vibration $W_3$ is dependent on the rotary inertia $J_1$ of the clutch driven element 40, on a torsional spring rate $K_1$ between the transmission and the clutch driven element, primarily controlled by the spring rate of the clutch springs 56, on a rotary inertia $J_2$ of the rotating transmission components (not shown), on a rotary inertia $J_3$ of the vehicle (not shown) as reflected through a final drive ratio of the vehicle, and on a torsional spring rate $K_2$ of the vehicle primarily controlled by the spring rate of the axles (not shown). The natural frequency $W_3$ is defined by the equation $W_3 = (((-J_1 J_3 - J_1 J_2) K_2 + (-J_2 J_3 - J_1 J_3) K_1 + ((J_1^2 J_3^2 + 2 J_1^2 J_2$ $*J_3 + J_1^2 J_2^2) K_2^2 + (2J_1^2 - 2J_1 J_2) J_3^2 + (-2J_1 J_2^2 - 2J_1^2 J_2) J_3 K_1 K_2 +$ $(J_2^2 + 2*J_1 J_2 + J_1^2) J_3^2 K_1^2)^{0.5} / (2*J_1 J_2 J_3))^{0.5}$ rad/sec.

When the engine firing frequency equals $W_3$ and there is incipient contact between the clutch driven element 40 and the clutch drive element 20, the clutch driven element 40 oscillates with such magnitude that that it can produce noise and vibrations both detectable by and objectionable to the operator of the vehicle. When this occurs, the ring shaped inertia element 66 is designed to oscillate at the natural frequency $W_3$, but out of phase with the system vibrations of natural frequency $W_3$ such that the amplitude of the oscillations is reduced to a minimum.

Obviously, many modifications and variations of the present invention are possible in view of the above teaching. It is therefore to be understood, that within the scope of the appended claims, the invention may be practiced otherwise than as specifically described.

The embodiment of the invention in which an exclusive property or privilege is claimed are defined as follows:

1. A tuned damper disposed within a torque converter of an automatic transmission of an engine driven vehicle for overcoming vibrations in a clutch disposed within the torque converter for driving a torque converter turbine directly by the engine, comprising:
   a clutch drive element having a rotatively rigid connection to the engine and a clutch engagement surface, and having an axis of rotation;
   a clutch driven element having a rotatively rigid connection to the engine and a clutch engagement surface, and having an axis of rotation;
   a clutch driven element having a clutch engagement surface complementary to the clutch engagement surface of the clutch drive element, selectively and frictionally engagable with the clutch drive element, having an axis of rotation common with the axis of rotation of the clutch drive element, having inertia about the axis of rotation, axially movable relative to the clutch drive element, and rotating with the clutch drive element after clutch engagement;
   a clutch hub linking the clutch driven element and an output element and moving axially with the clutch driven element, rotatively fixed and axially movable relative to the output element;
   clutch springs interposed between the clutch driven element and the clutch hub such that relative rotary movement between the clutch driven element and the clutch hub axially compresses the springs producing a torsional load between the clutch driven element and the clutch hub, providing a torsional spring rate between the clutch driven element and the clutch hub;
   the clutch driven element and the clutch hub each having a corresponding plurality of openings for the disposition of the clutch springs, the openings being of approximately the same size and shape as the springs in their free state;
   a natural frequency of rotary vibration for a driveline system dependent on the rotary inertia of the clutch driven element, on a torsional spring rate between the transmission and the clutch driven element primarily controlled by the torsional spring rate between the clutch driven element and the clutch hub, on a rotary inertia of rotating transmission components, on a rotary inertia of the vehicle as reflected through a final drive ration of the vehicle, and on a torsional spring rate of the vehicle primarily controlled by an axle spring rate;
   a ring shaped inertia element centered relative to the axis of rotation of the clutch driven element in parallel with the output element; and
   a visco-elastic material element with both torsional spring and torsional damping characteristics linking the ring shaped inertia element with the clutch driven element.

2. A tuned damper as recited in claim 1, the tuned damper further comprising:
   a lip, being located at the outer periphery of and integral with the clutch driven element, projecting away from the engagement surface of the clutch drive element, being centered relative tot he axis of rotation of the clutch drive element and the clutch driven element; and
   the visco-elastic material element, concentric with the ring shaped inertia element, being attached on an outside diameter to an inside diameter of the lip, and being attached on an inside diameter to the ring shaped inertia element.

3. A tuned damper disposed within a torque converter of an automatic transmission of an engine driven vehicle for overcoming vibrations in a clutch disposed within the torque converter for driving a torque converter turbine directly by the engine, comprising:
   a clutch drive element having a rotatively rigid connection to the engine and a clutch engagement surface, and having an axis of rotation;
   a clutch driven element having a clutch engagement surface complementary to the clutch engagement surface of the clutch drive element, selectively and frictionally engagable with the clutch drive element, having an axis of rotation common with the axis of rotation of the clutch drive element, having inertia about the axis of rotation, axially movable relative to the clutch drive element, and rotating with the clutch drive element after clutch engagement;
   a clutch hub linking the clutch driven element and an output element and moving axially with the clutch driven element, rotatively fixed and axially movable relative tot he output element;
   clutch springs interposed between the clutch driven element and the clutch hub such that relative rotary movement between the clutch driven element and the clutch hub axially compresses the springs producing a torsional load between the clutch driven element and the clutch hub, providing a torsional spring rate between the clutch driven element and the clutch hub;
   the clutch driven element and the clutch hub each having a corresponding plurality of openings for the disposition of the clutch springs, the openings being of approximately the same size and shape as the springs in their free state;
   a natural frequency of rotary vibration $W_3$ for a driveline system dependent on the rotary inertia $J_1$ of the clutch driven element, on a torsional spring rate $K_1$ between the transmission and the clutch driven element, primarily controlled by the torsional spring rate between the clutch driven element and the clutch hub, on a rotary inertia $J_2$ of rotating transmission components, on a rotary inertia $J_3$ of the vehicle as reflected through a final drive ration of the vehicle, and on a torsional spring rate $K_2$ of the vehicle primarily controlled by an axle spring rate, that dependence defined by an equation $W_3 = (((-J_1J_3 - J_1J_2)K_2 + (-J_2J_3 - J_1J_3)K_1) + ((J_1^2J_3^2 + 2J_1^2J_2*J_3 + J_1^2J_2^2)K_2^2 + (2J_1^2 - 2J_1J_2)J_3^2 + (-2J_1J_2^2 - 2J_1^2J_2)J_3K_1K_2 + (J_2^2 + 2*J_1J_2 + J_1^2)J_3^2K_1^2)^{0.5}/(2*J_1J_2J_3))^{0.5}$ rad/sec.

a ring shaped inertia element centered relative to the clutch driven element in parallel with the output element; and a visco-elastic material element with both torsional spring and torsional damping characteristics linking the ring shaped inertia element and the clutch driven element.

4. A tuned damper as recited in claim 3, the tuned damper further comprising:

a lip, being located at the outer periphery of and integral with the clutch driven element, projecting away from the engagement surface of the clutch drive element, being centered relative to the axis of rotation of the clutch drive element and the clutch driven element; and the visco-elastic material element, concentric with the ring shaped inertia element, being attached on an outside diameter to an inside diameter of the lip, and being attached on an inside diameter to the ring shaped inertia element.

* * * * *